（12） United States Patent
Chetverikov et al.

(10) Patent No.: US 10,387,359 B2
(45) Date of Patent: *Aug. 20, 2019

(54) SYSTEMS AND METHODS FOR ACCESSING VEHICLE COMMUNICATIONS BUS INFORMATION FOR AN APPLICATION PROCESSOR

(71) Applicant: Scantool.net LLC, Phoenix, AZ (US)

(72) Inventors: Vitaliy Chetverikov, Peoria, AZ (US); Vitaliy Maksimov, Airway Heights, WA (US); Jacob Hartsoch, Bellingham, WA (US); Lester Meeks, Lynden, WA (US); Mark M. Moeller, Everson, WA (US)

(73) Assignee: Scantool.net LLC, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/677,433

(22) Filed: Aug. 15, 2017

(65) Prior Publication Data

US 2017/0364470 A1    Dec. 21, 2017

Related U.S. Application Data

(63) Continuation of application No. 14/796,941, filed on Jul. 10, 2015, now Pat. No. 9,734,119.

(Continued)

(51) Int. Cl.
| | | |
|---|---|---|
| *G06F 13/42* | (2006.01) | |
| *B60R 16/023* | (2006.01) | |
| *G07C 5/02* | (2006.01) | |
| *G07C 5/08* | (2006.01) | |
| *G06F 1/26* | (2006.01) | |
| *G06F 13/40* | (2006.01) | |
| *G06F 13/22* | (2006.01) | |
| *H04L 29/08* | (2006.01) | |
| *G07C 5/00* | (2006.01) | |

(52) U.S. Cl.
CPC ........ *G06F 13/4282* (2013.01); *B60R 16/023* (2013.01); *G06F 1/26* (2013.01); *G06F 13/22* (2013.01); *G06F 13/4068* (2013.01); *G07C 5/02* (2013.01); *G07C 5/08* (2013.01); *H04L 67/12* (2013.01); *G07C 5/008* (2013.01)

(58) Field of Classification Search
CPC ........ G06F 13/4282; G06F 1/26; G06F 13/22; G06F 13/4068; H04L 67/12; B60R 16/023; G07C 5/02; G07C 5/08; G07C 5/008
USPC .......................................................... 701/29
See application file for complete search history.

(56) References Cited

U.S. PATENT DOCUMENTS

| | | | | |
|---|---|---|---|---|
| 7,522,979 B2* | 4/2009 | Pillar | ............. | G01M 17/00 340/438 |
| 8,781,442 B1* | 7/2014 | Link, II | ............. | G08G 1/205 455/411 |

(Continued)

*Primary Examiner* — Jaime Figueroa
(74) *Attorney, Agent, or Firm* — Michael R. Schacht; Schacht Law Offfice, Inc.

(57) ABSTRACT

A vehicle interface system comprises a vehicle interface processor, a processor data interconnect system, a vehicle communications bus electrical connection system, vehicle interface software, and an application data collection process running on the application processor using spare cycles not used by the application primary process. The application data collection process communicates with the vehicle interface software using the processor data interconnect system.

21 Claims, 3 Drawing Sheets

Related U.S. Application Data

(60) Provisional application No. 62/022,767, filed on Jul. 10, 2014.

(56) References Cited

U.S. PATENT DOCUMENTS

| | | | | |
|---|---|---|---|---|
| 9,112,700 B2* | 8/2015 | Link, II | ............ | G08G 1/205 |
| 2005/0114007 A1* | 5/2005 | Pillar | ............ | A62C 27/00 |
| | | | | 701/82 |
| 2006/0229777 A1* | 10/2006 | Hudson | ............ | G01M 15/05 |
| | | | | 701/31.4 |
| 2014/0294180 A1* | 10/2014 | Link, II | ............ | G08G 1/205 |
| | | | | 380/270 |
| 2016/0066127 A1* | 3/2016 | Choi | ............ | H04W 4/008 |
| | | | | 455/41.2 |

* cited by examiner

SYSTEMS AND METHODS FOR ACCESSING VEHICLE COMMUNICATIONS BUS INFORMATION FOR AN APPLICATION PROCESSOR

RELATED APPLICATIONS

This application, U.S. patent application Ser. No. 15/677,433 filed Aug. 15, 2017, is a continuation of U.S. patent application Ser. No. 14/796,941 filed Jul. 10, 2015, now U.S. Pat. No. 9,734,119 issued Aug. 15, 2017, the contents of which is incorporated herein by reference in its entirety.

U.S. patent application Ser. No. 14/796,941 claims priority from U.S. Provisional Application Ser. No. 62/022,767 filed Jul. 10, 2014, the contents of which is incorporated herein by reference in its entirety.

TECHNICAL FIELD

The present invention relates to onboard diagnostics systems used on vehicles and, more particularly, to systems and method for facilitating the collection of data from the onboard diagnostics system by an application processor.

BACKGROUND

The present invention relates generally to vehicle interfaces (e.g., Onboard Diagnostics version 2 (OBD 2)) and more specifically to a system and method for accessing vehicle communications bus information outside the bandwidth of a limited application processor (e.g., a Central Processing Unit (CPU)) without missing critical information.

In particular, the limited application processor typically used to process data from a vehicle interface is implemented using existing processing hardware (e.g., the processor of a modem) and/or may employ a software language that is not capable or appropriate for the real time collection and/or processing of data from the vehicle interface.

The need thus exists for systems for collecting and processing data from a vehicle interface that optimize the use of a limited application processor in the context of data being generated in real time.

SUMMARY

The invention generally relates to a vehicle interface (e.g., an OBD 2) which includes a vehicle interface processor and its software and to the interconnection of the vehicle interface processor to an application processor and to the vehicle interface.

Outlined in this section are some of the features of the invention in order that the detailed description thereof may be better understood, and in order that the present contribution to the art may be better appreciated. Additional features of the invention will be described hereinafter.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting. An object is to provide a system and method for accessing vehicle communications bus information outside the bandwidth of a limited application processor or CPU without missing critical information.

Another object is to provide a system and method for accessing vehicle communications bus information outside the bandwidth of a limited application processor or CPU that defines an interface for a dedicated processor or processing core that removes the burden of processing hard real time data on a vehicle data bus from an limited application processor or CPU responsible for recording, analyzing, and/or reporting that data.

Another object is to provide a system and method for accessing vehicle communications bus information outside the bandwidth of a limited application processor or CPU that cooperatively controls the power of the application processor and the vehicle interface processor.

Another object is to provide a system and method for accessing vehicle communications bus information outside the bandwidth of a limited application processor or CPU that places the burden of responding to hard real time vehicle data events entirely at the vehicle interface processor level while minimizing the use of the processing capacity of the limited application processor or CPU.

Another object is to provide a system and method for accessing vehicle communications bus information outside the bandwidth of a limited application processor or CPU that provides a watchdog for the limited application processor to ensure it is operating properly.

Another object is to provide a system and method for accessing vehicle communications bus information outside the bandwidth of a limited application processor or CPU that collects requested data for the limited application processor and queues it up until the limited application processor is ready to receive the requested data.

Another object is to provide a system and method for accessing vehicle communications bus information outside the bandwidth of a limited application processor or CPU that provides vehicle data integration for computing certain metrics related to how the vehicle is being operated.

Another object is to provide a system and method for accessing vehicle communications bus information outside the bandwidth of a limited application processor or CPU that enumerates a set of features that allow or enhance performance analysis of the behavior of the operator of the vehicle.

Another object is to provide a system and method for accessing vehicle communications bus information outside the bandwidth of a limited application processor or CPU that is able to generate an identifier for the motor vehicle based on its attributes.

Another object is to provide a system and method for accessing vehicle communications bus information outside the bandwidth of a limited application processor or CPU that reports how long the system has been operational, approximate time of last power loss, and reason for last restart.

Other objects and advantages of the present invention will become obvious to the reader and it is intended that these objects and advantages are within the scope of the present invention. To the accomplishment of the above and related objects, this invention may be embodied in the form illustrated in the accompanying drawings. The drawings are, however, illustrative only, and changes may be made in the specific construction illustrated and described within the scope of this application.

The present invention may thus be embodied as a vehicle interface system for accessing data in real time from an onboard diagnostics system through a vehicle interface and a vehicle communications bus and transmitting the data to an application processor running an application primary process. The vehicle interface system comprises a vehicle interface processor, a processor data interconnect system, a vehicle communications bus electrical connection system, vehicle interface software, and an application data collection process. The processor data interconnect system is capable of transferring data between the vehicle interface processor and the application processor. The vehicle communications bus electrical connection system is operatively connected to the vehicle interface and is capable of transferring diagnostic data between the vehicle interface processor and the onboard diagnostics system. The vehicle interface software runs on the vehicle interface processor. The application data collection process runs on the application processor using spare cycles not used by the application primary process, where the application data collection process communicates with the vehicle interface software using the processor data interconnect system.

The present invention may further be embodied as a vehicle interface system comprising a vehicle, a vehicle interface processor, an application processor, a processor data interconnect system, a vehicle communications bus electrical connection system, vehicle interface software, and an application data collection process. The vehicle comprises an onboard diagnostics system, a vehicle interface, and a vehicle communications bus. The processor data interconnect system is capable of transferring data between the vehicle interface processor and the application processor. The vehicle communications bus electrical connection system is operatively connected to the vehicle interface and is capable of transferring diagnostic data between the vehicle interface processor and the onboard diagnostics system. The vehicle interface software runs on the vehicle interface processor. The application data collection process runs on the application processor using spare cycles not used by the application primary process, where the application data collection process communicates with the vehicle interface software using the processor data interconnect system.

The present invention may also be embodied as a method of accessing data from an onboard diagnostics system through a vehicle interface and a vehicle communications bus and transmitting the data to an application processor, comprising the following steps. A vehicle interface processor, a processor data interconnect system, and a vehicle communications bus electrical connection system are provided. The processor data interconnect system is capable of transferring data between the vehicle interface processor and the application processor. The vehicle communications bus electrical connection system is operatively connected to the vehicle interface and is capable of transferring diagnostic data between the vehicle interface processor and the onboard diagnostics system. The vehicle interface software runs on the vehicle interface processor. The application data collection process runs on the application processor using spare cycles not used by the application primary process. The application data collection process communicates with the vehicle interface software using the processor data interconnect system.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION

Figure 1:
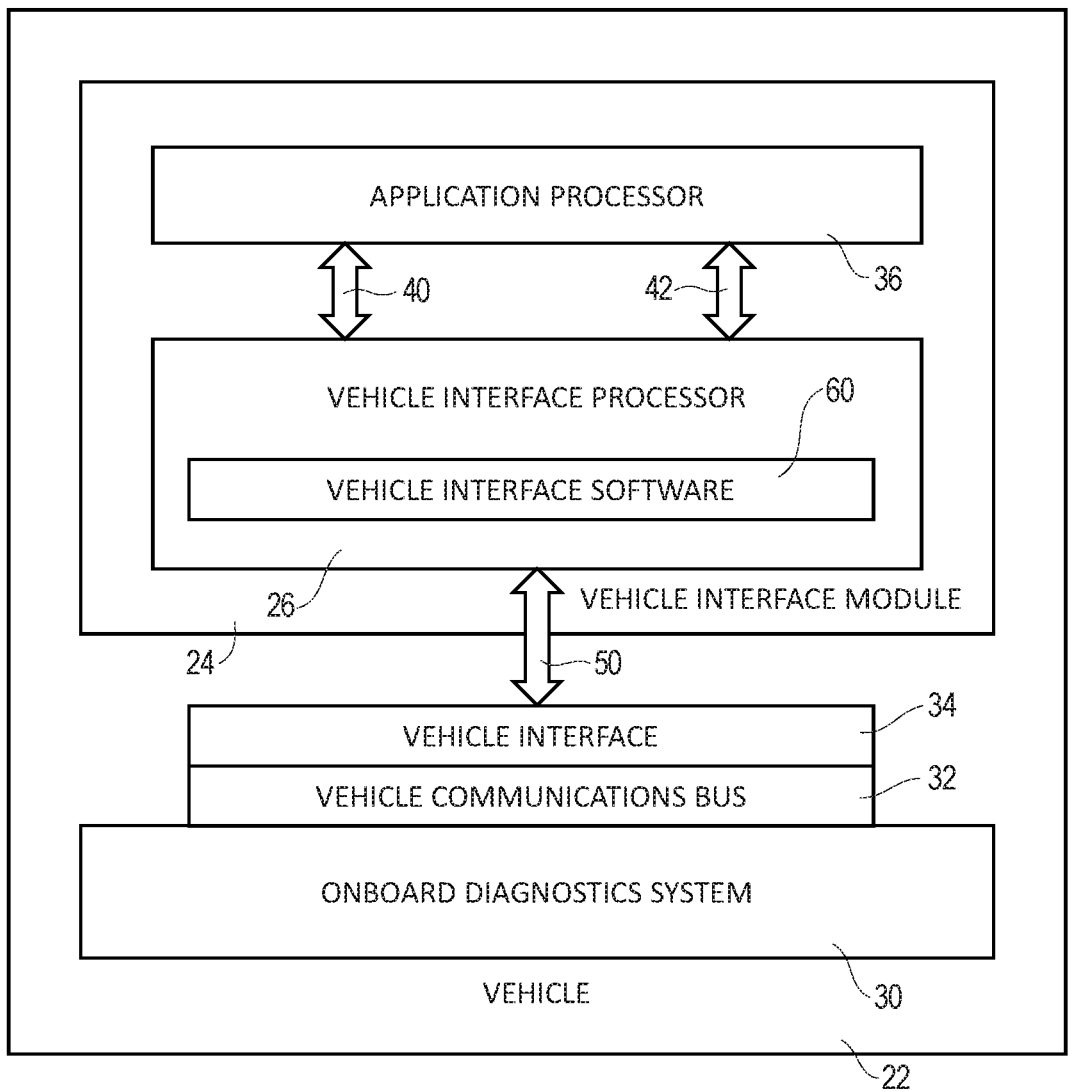
FIG. 1 is a block diagram illustrating an example embodiment of the overall system of the present invention.
Figure 2:
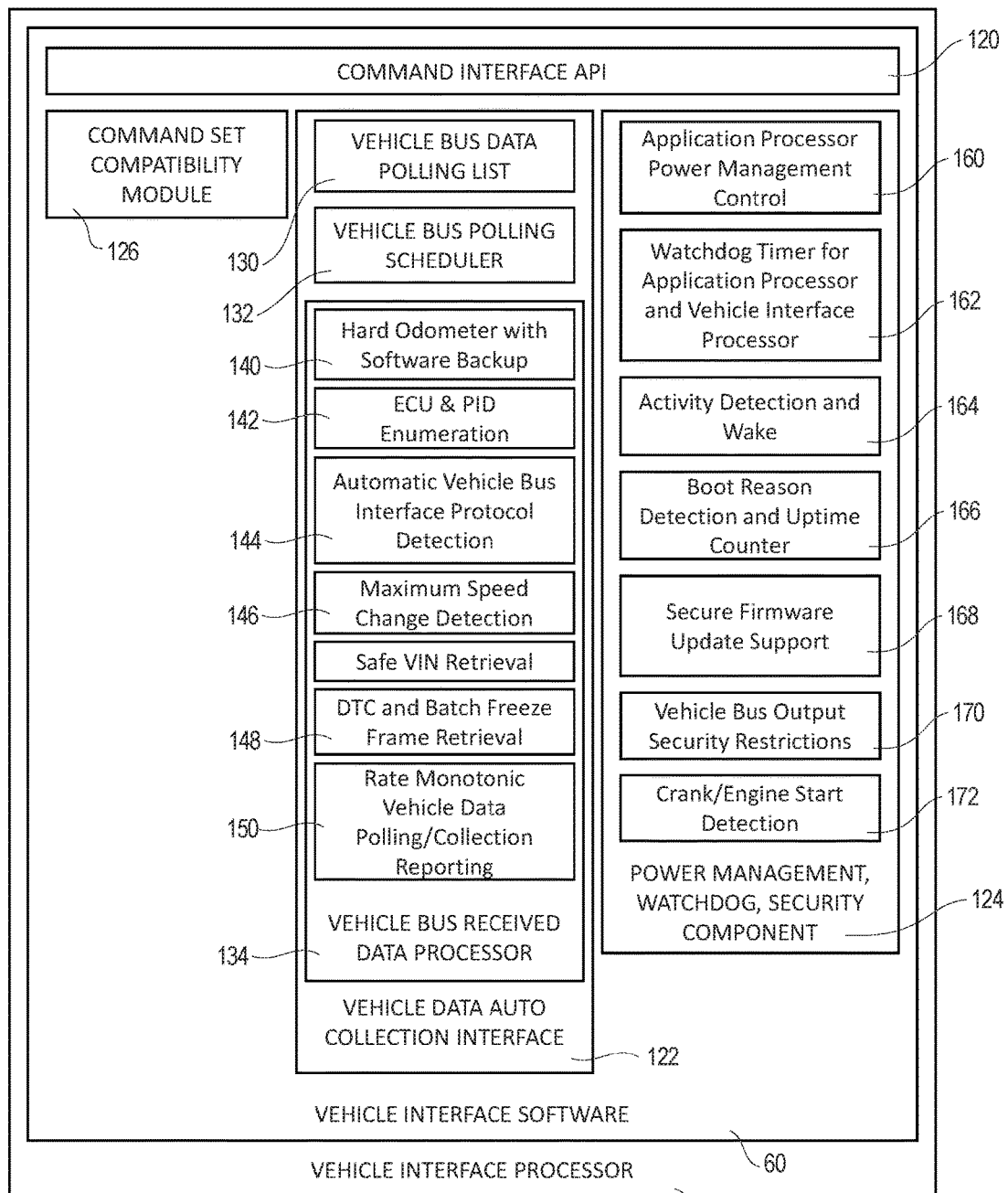
FIG. 2 is a block diagram illustrating details of an example vehicle interface processor of the present invention.
Figure 3:
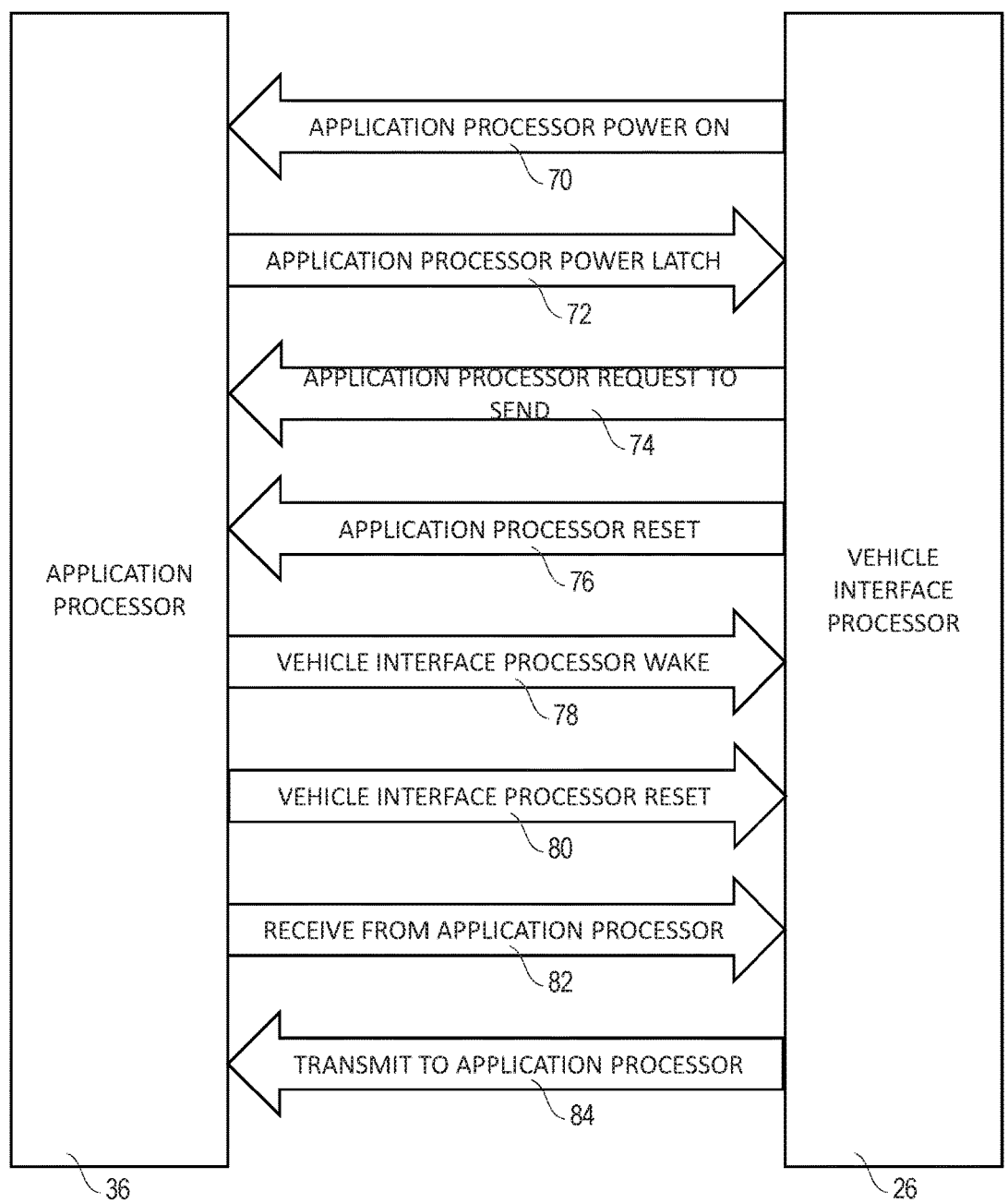
FIG. 3 is a block diagram illustrating descriptions of example processor control and data signals transmitted between the example limited application processor and the example vehicle interface processor.

Turning now to the drawing, FIGS. 1-3 illustrate an example vehicle data processing system 20 of the present invention. The example vehicle data processing system 20 is adapted to be connected to or form a part of a vehicle 22. The example vehicle data processing system 20 comprises a vehicle interface module 24 comprising a vehicle interface processor 26 (sometimes referred to herein as "the VIP").

The example vehicle 22 comprises an onboard diagnostic system 30 and a vehicle communications bus 32 and defines a vehicle interface 34. The example vehicle 22 further comprises an application processor 36 (sometimes referred to herein as "the AP"). As will be explained below, the application processor 36 has limited processing capacity. The vehicle interface module 22 is adapted to be operatively connected between the vehicle interface 34 of the vehicle 22 and the limited capacity application processor 36.

In particular, the vehicle interface module 24, and vehicle interface processor 26 forming a part thereof, interconnects with the application processor 36 and the vehicle interface 34. In general, the application processor 36 sends and receives processor power control signals to the interface processor 26 using a processor power and control system 40 and data signals to the interface processor 26 using a processor data interconnect system 42. The vehicle interface 34 defines a vehicle communications bus electrical connection system 50 (e.g., SAE J1962, SAE J1939, etc), and the vehicle interface processor 26 is connected to the vehicle 22 through the vehicle interface 34 using the vehicle communications bus electrical connection system 50. And as will be explained in further detail below, vehicle interface software 60 runs on the example vehicle interface processor 26.

The vehicle 22, the onboard diagnostic system 30, and the application processor 36 are or may be conventional and will be described herein only to that extent necessary for a complete understanding of the principles of the present invention.

I. Application Processor

FIGS. 1 and 2 illustrate that the vehicle interface processor 26 is connected to the application processor 36 using the processor power control system 40 and the data signals using the processor data interconnect system 42. The vehicle interface processor 24 is independent of the details the application processor 36, and in fact the application processor 36 may take many different forms. For example, one common implementation of the application processor 36 is to use spare processing capacity of the processor of a modem such as a wireless modem. Another common implementation of the application processor is to use low-end processors or microcontrollers running a script interpreter. Either of these implementations of the application processor 36 may be used, for example, as part of an insurance dongle, telematics, or fleet tracking dongle used in connection with vehicles.

A common attribute of the processors used as the application processor 36 is that they have a highly limited capacity to collect data in real time. For example, using the spare cycles of a modem processor to implement the functionality of the application processor obviates the need to purchase a dedicated application processor but limits the capacity of the processing (e.g., real time data collection) that can be performed by the application processor. As another example, other processors may be desirable because of low cost, but these processors and/or the software running on those processors (e.g., Python) may be ill-suited to the collection of data in real time.

Accordingly, while the precise functionality of the example application process 36 may vary depending upon the circumstances (e.g., telematics, insurance data collection, fleet tracking), the example application processor 36 forming a part of the present invention will be characterized by the need to use OBD data from the onboard diagnostics system 30 but, because of convenience and/or cost reduction considerations, a limited capability to collect such data in real time.

The example application processor 36 thus is or may be conventional and will be described herein only to that extent necessary for a complete understanding of the present invention.

II. Onboard Diagnostics System

FIG. 1 illustrates that the onboard diagnostics system 30 is connected to the vehicle interface processor 26 through the vehicle communications bus 32 and vehicle interface 34. The specifics of the onboard diagnostics system 30, vehicle communications bus 32, and vehicle interface 34 may be unique to a particular manufacturer or model but will typically generally conform to a standard such as OBD-II. Standards such as OBD-II were originally developed primarily for diagnostic purposes. Subsequently, OBD-II and similar standards were adapted for use with real time monitoring and control applications, but the components used to implement such interfaces, such as the vehicle communications bus 32, are prone to interference when data is collected from the onboard diagnostic system 30.

The example onboard diagnostics system 30 thus is or may be conventional and will be described herein only to that extent necessary for a complete understanding of the present invention.

III. Vehicle Interface Processor

The vehicle interface processor 26 is configured to interface with the vehicle interface 34 and the application processor 36. The vehicle interface processor 26 collects OBD data from the onboard diagnostics system 30 in real time. The collected OBD data is then transmitted in a desired format or formats and at a desired time or times to the application processor 36. The vehicle interface processor 26 further collects the OBD data from the onboard diagnostics system 30 in a manner that is unlikely to interfere with operation of the onboard diagnostics system 30 and/or the vehicle 22 containing the onboard diagnostics system 30.

More specifically, FIGS. 1-3 illustrate that the vehicle interface processor 26 executes code embodying the vehicle interface software 60. As will be described in further detail below, the vehicle interface processor 26 provides the application processor 36 with access to the vehicle interface 34. The example vehicle interface processor 26 supports signal lines to implement the power and control signals using the processor power control system 40 and the data signals using the processor data interconnect system 42, is able to interface to vehicle communications bus electrical signals through the vehicle communications bus electrical connection system 50, and has enough computing power to execute software (e.g., the vehicle interface software 60, etc.) as required by an implementation of the present invention to carry out the functions described herein.

The example vehicle interface processor 26 is or may be any microcontroller or CPU capable of running the vehicle interface software 60 as described below, supporting the process power control signals and data interconnect signals of the application processor 36, and supporting the vehicle communications bus electrical connection system 50 of the vehicle interface 34. Example processors that may be used as the vehicle interface processor 26 may be the Microchip PIC24 or Microchip PIC32 processors. Processors from ST Micro's STM32 family or Atmel's 32 bit MCU line may also be used to implement the vehicle interface processor 26.

Alternatively, the vehicle interface processor 26 could be an ARM, Intel x86 or other CPU type processor commonly used as general purpose processor. In addition, it may be possible to implement the signal processing and logic functions of the vehicle interface processor 26 using a custom ASIC or the like. The architecture of a vehicle interface system of the present invention, such as the example vehicle data processing system 20 described herein, is flexible enough to support a wide variety of processing options.

IV. Processor Power and Control Signals and Data Signals

The processor power control system 40 and the processor data interconnect system 42 allow the vehicle interface processor 26 to control the power and reset signals of the application processor 36 as well as exchange data signals with the application processor 36. The processor power control signals and processor data interconnect signals are bidirectional as illustrated in FIG. 1. Accordingly, the application processor 36 may also affect a reset of the vehicle interface processor 26.

FIG. 3 of the drawing depicts examples of several signal flows between the application processor 36 and the vehicle interface processor 26. Each of these signal flows will be described separately below.

Application Processor—Power On signal flow 70 (Output to Application Processor): Pin controls the enable of the AP's power supply. Asserting this pin will force the power supply on and will start the application processor 36. The application processor 36 can latch the power supply in the "on" state, so the AP can remain in the on state even if the Power On line is de-asserted.

Application Processor—Power Latch signal flow 72 (Input from Application Processor): The AP asserts this line to keep its power supply in the "on" state. When the VIP asserts the AP Power On line, it should expect the AP to assert the Power Latch line within a predetermined amount of time (e.g., 2 minutes). If the Power Latch line is not asserted within that time, it indicates an error condition, allowing the VIP to perform a recovery sequence (e.g., power cycle the AP).

Application Processor—Request to Send signal flow 74 (Output to Application Processor): The AP asserts this line to keep its power supply in the "on" state. When the VIP asserts the AP Power On line, it should expect the AP to assert the Power Latch line within a predetermined amount of time (e.g., 2 minutes). If the Power Latch line is not asserted within that time, it indicates an error condition, allowing the VIP to perform a recovery sequence (e.g., power cycle the AP).

Application Processor—Reset signal flow 76 (Output to Application Processor): Reset signal flow 76 (Output to Application Processor): This line is used to reset the application processor 36.

Vehicle Interface Processor—Wake signal flow 78 (Input from Application Processor): Asserting this line wakes the VIP. This functionality can be disabled if the input voltage from the vehicle 22 is below a software settable threshold.

Vehicle Interface Processor—Reset signal flow 80 (Output to Vehicle Interface Processor): This line is used to reset the VIP 26.

Receive from Limited Application Processor signal flow 82 (Input from Limited Application Processor): The serial data from the application processor 36 to the VIP comes across this signal line.

Transmit to Limited Application Processor signal flow 84 (Output to Limited Application Processor): The serial data to the application processor 36 from the VIP comes across this signal line.

V. Vehicle Interface

The vehicle interface 34 may be one of a variety of vehicle communications bus connections as defined by the onboard diagnostics system 30. In any event, a particular vehicle communications bus electrical connection may be vehicle manufacturer specific or may be a combination of one or more vehicle communications bus interfaces.

VI. Vehicle Interface Software

The vehicle interface software 60 runs on the vehicle interface processor 26 and, in combination with the vehicle interface processor 26, the application processor 36, and vehicle interface 34 defined by the onboard diagnostics system 30, implements the functionality of the example vehicle data processing system 20. The vehicle interface software 60 is responsible for interacting with and processing the signals entering the vehicle interface processor 26, including processor power control signals using the processor power and control system 40, the data signals using the processor data interconnect system 42, and onboard diagnostic signals accessible from the onboard diagnostics system 30 through the vehicle interface 34.

In the example vehicle data processing system 20 of the present invention described herein, the vehicle interface software 60 implements the functionality (e.g., signal processing, logic, and data aggregation) of the vehicle interface module 24.

As shown in FIG. 2, the example vehicle interface software 60 comprises the following components: a command interface API component 120, a vehicle Data auto collection interface component 122, a power management, watchdog, and security component 124. Optionally, the example vehicle interface software 60 further comprises a command set interface component 126.

The command interface API component 120 is the mechanism by which the application processor 36 utilizes the features of the vehicle interface processor 26. Data signals transmitted from the application processor 36 across the processor data interconnect system 42 are received by the command interface API component 120 of the vehicle interface processor 26. The data received by the API component 120 is parsed for a command, and then the command is dispatched to the appropriate subsystem of the vehicle interface processor 26 as will be described in further detail below in relation to FIG. 2. When the subsystem returns with results, the results are then sent back to the application processor 36 over the processor data interconnect system 42.

Due to the time critical nature of processing many forms of vehicle data, the vehicle interface processor 26 should comprise a software/hardware combination capable of performing "hard real-time" processing on the vehicle data. This is often not possible with the processors and software used to implement limited application processors used for application tasks related to vehicle data processing such as the example application processor 36.

The hard real time tasks commonly necessary for vehicle data interfaces are called out in FIG. 2. The tasks depicted in FIG. 2 are broken down into a series of steps that are processed at a high frequency and scheduled according to priority of the data.

Features included in the vehicle auto collection interface 122 include a vehicle communications bus data polling list 130, a vehicle communications bus polling scheduler 132, and a vehicle communications bus received data processor 134. The vehicle communications bus data polling list 130 keeps track of what vehicle communications bus data needs to be requested, how often to request it, from what source and to what target address on the bus the transaction needs to occur on and what data element ID (like PGN or PID) needs to be used for the transaction. The vehicle communications bus polling scheduler 132 keeps track of what data needs to be requested, when, and in what order. It determines when to not perform transactions, such as if the vehicle 22 is not operational, or if performing the transaction might cause deleterious effects to the vehicle 22 (such as overloading the vehicle communications bus).

The vehicle communications bus received data processor 134 takes the data that results from the polling of the vehicle communications bus and sends it through a series of parsers to extract the relevant information from that data. All the results are then reported back up to the application processor 36 through the command interface API component 120.

More specifically, the vehicle communications bus received data processor 134 comprises a hard odometer software backup routine 140, a ECU & PID enumeration routine 142, an automatic vehicle communications bus interface protocol detection routine 144, a maximum speed change detection routine 146, a safe VIN retrieval routine 148, a DTC and batch freeze frame retrieval routine 150, and a rate monotonic vehicle data polling/collection reporting routine 152.

The hard odometer software backup routine 140 checks to see if the vehicle 22 reports odometer on the vehicle communications bus and if not, computes the distance the vehicle travels by integrating speed over time.

The ECU & PID enumeration routine 142 determines what ECU(s) (Engine Control Units) are on the vehicle communications bus and what data (PIDs or Parameter IDs) the ECU(s) can generate.

The automatic vehicle communications bus interface protocol detection routine 144 runs when the vehicle communications bus comes to life to determine which protocol or protocols the individual vehicle 22 supports. Data indicative of the protocol or protocols detected is cached until a power loss occurs.

The maximum speed change detection routine 146 measures how quickly the vehicle 22 accelerates or decelerates and reports this each time the command interface API component 120 requests it. This is used to detect hard braking and hard acceleration events.

The safe VIN retrieval routine 148 obtains the VIN from the vehicle 22 in such a way that the vehicle communications bus will not be overloaded causing the vehicle 22 to stall.

The DTC and batch freeze frame retrieval routine 150 pulls all the pending diagnostic trouble codes for an ECU as well as data the ECU has logged regarding the details of the failure, such as OBD 2 freeze frame data.

The rate monotonic vehicle data polling/collection and reporting routine 152 takes a list of vehicle data identifiers (e.g., ECU, Source Address, Target Address, Data ID) from the application processor 36 and retrieves that data at a periodic interval and either saves the last known good value or builds a log of the retrieved values since the last request from the application processor 36. Data saved or logged by the rate monotonic vehicle data polling/collection and reporting routine 152 is published through the command interface API component 120. This data is time-stamped, preferably at least to the millisecond of arrival.

The features of the power management, watchdog, and security component 124 minimize excessive drain on the vehicle battery, make the system self-healing in face of failure, and guard against "hacking" into the vehicle's network. The example power management, watchdog, and security component 124 comprises an application processor power management control routine 160, a watchdog timer routine 162, an activity detect and wake routine 164, a boot reason detection and uptime counter routine 166, a secure firmware update support routine 168, a vehicle communications bus output security restrictions routine 170, and a crank/engine start detection routine 172.

The application processor power management control routine 160 controls how power is used. This routine 160 uses vehicle voltage to determine when to wake up the vehicle interface processor 26 and application processor 36 and when to put both the vehicle interface processor 26 and the application processor 36 to sleep when no longer needed. The application processor power management control routine 160 also allows for each of processors 26 and 36 to be reset by each other in the event that either of the processors 26 or 36 is no longer operating properly.

The watchdog timer routine 162 detects when either of the application processor 36 or the vehicle interface processor 26 is not responding properly. If either of these processors 26 or 36 is not responding properly, the watchdog timer routine 162 will attempt to reset the improperly responding processor.

The boot reason detection and uptime counter routine 166 will detect the reason for the reboot of the vehicle interface processor 26, and keep track of the uptime so that the application processor 36 can take appropriate action.

The secure firmware update support routine 168 allows specially signed firmware to be placed on the vehicle interface processor 26 so that only authorized sources can publish new firmware to the processor 26.

The vehicle bus output security restrictions routine 170 allows a securely signed list of authorized vehicle bus commands to be published. Only these commands will be allowed to be sent on the vehicle bus 32 either by the application processor 36 using the command interface API component 120 or from the vehicle interface processor 26 itself. These limits on the vehicle bus commands that may be published guard against viruses or malware from gaining control of the vehicle 22 through the vehicle interface processor 26.

The crank/engine start detection routine 172 detects engine cranks by detecting dips in the vehicle battery voltage and engine starts by tracking system voltage changes from lower to higher charging voltages. An example of the crank/engine start detection routine 172 will be described in further detail below.

Subject to the restrictions implemented by the vehicle communications bus output security restrictions routine 172, command set compatibility module component 126 implements the features of the widely used STN11xx OBD interpreter. Implementation of these features is useful for backward compatibility with legacy software solutions, or solutions that need particularly fine levels of control when accessing the Onboard Diagnostics System 30.

Other data parsers for performing tasks may also be implemented as part of the vehicle interface software 60 running on the vehicle interface processor 26. Examples of additional tasks that may be performed by the vehicle interface software include a fuel economy routine, a fuel tank level routine, and/or an engine efficiency routine.

For vehicle communications buses that broadcast vehicle data or information instead of requiring that the vehicle data or information be polled, the polling step is omitted, and the vehicle data is sampled at the requested rate as if it were polled.

VII. Interconnections

As generally described above, the primary functionality of the vehicle interface module 24 is implemented by the vehicle interface processor 26. The vehicle interface processor 26 connects to onboard diagnostics system 30 using the vehicle interface 34. The vehicle interface processor 26 further connects to the application processor 36 via the processor power and control signal system 40 to power on and monitor the application processor 36 and to exchange data and commands via the processor data interconnect system 42.

The vehicle interface processor 26 runs the vehicle interface software 60 which implements the various subsystems enumerated in FIG. 2.

VIII. Operation of Example Vehicle Interface Module

When the example vehicle interface processor 26 has detected an event that requires waking, an application processor power on line 70 of the processor power and control system 40 is held high. When a command to sleep the vehicle interface processor 26 is issued, the application power processor power on line 70 is held low. This feature allows the application processor 36 to issue a sleep command to vehicle interface processor 26, and then power itself down gracefully.

Detailed Power Up Sequence:
1. Perform detect power event process during sleep or initial power or wake from the wake input of the vehicle interface processor 26.
2. Drive application processor power on line to logic high.
3. Produce a wake pulse on application processor request to send line.
4. Check for application power latch (or timeout) signal.
5. If application power latch signal is high, do normal operation.
6. If application power latch signal is not high (e.g., Timeout), do retry or reset.

Detailed Power Down Sequence:
1. Normal Operation.
2. Sleep command received via UART.
3. Drive application processor power on line to logic low.
4. Enter sleep mode after timeout given in command or configured.

Once operational, the vehicle interface processor 26 begins listening for commands from the application processor 36 via the processor data interconnect system 42. The vehicle interface processor 26 also simultaneously starts listening to the onboard diagnostics system 30 via the vehicle interface 34 so that it can determine what vehicle communications buses are in the vehicle, what protocols any detected vehicle communications buses are using, what ECUs are on those buses, and what data elements those ECUs can provide.

When active, the vehicle interface processor 26 continues monitoring to determine whether any watchdog petting commands are received from the application processor 36. If the vehicle interface processor 26 does not receive a command on the command interface at least once every predetermined time period (e.g., every <n> seconds, where "n" is a predetermined time period in seconds), the vehicle interface processor 26 will assert the application processor reset command. This functionality is disabled by default and is enabled by a command specifying the predetermined time period as the maximum number of seconds allowed between petting. The feature is disabled by setting the predetermined number of seconds to 0.

The vehicle data monitoring features intrinsic to the vehicle communications bus received data processor 134 of the vehicle interface processor 26 will begin receiving the data they require and storing the data or results received.

The command interface will be running in a loop parsing commands such as:

A. A command to list all data buses, their protocols, their ECUs, and the data elements that are supported by all ECUs. This command will be used by the application code to determine which ECU to use for which data element, and also to help uniquely identify vehicles.

B. A command to retrieve the Odometer. If the vehicle's Odometer can be queried over the vehicle interface, then this command uses the query to determine the odometer value. Otherwise, the command uses a software odometer.

C. A command to retrieve the number of cold boots the vehicle interface processor 26 has identified. This command is used to detect if the vehicle interface 34 has lost power at some point in the past.

D. A command that returns the maximum acceleration values in meters/sec^2 since the last issue of the command. The report takes the form <DDD>, <AAA> where DDD=Maximum deceleration and AAA=Maximum Acceleration.

E. The vehicle interface processor 26 shall maintain a running milliseconds counter since the last power event occurred. A power event is defined as any event that causes the vehicle interface processor 26 interface to power on the application processor 36. In one embodiment, this counter process is performed by the same timer that is used to timestamp results in the Data Monitoring command.

F. The interface shall return the VIN of the vehicle 22 anytime the vehicle interface processor 26 is active, even if the vehicle communications bus is not active. The VIN will be returned if it is available and ERROR will be returned if it is not available.

G. A command returns the active diagnostic trouble codes (DTCs) of the vehicle 22 any time the vehicle interface processor 26 is active, even if the vehicle communications bus is not active. The status of DTCs will be available independent of vehicle communications bus 32 being active. Separate commands for stored, pending, and permanent DTCs may be provided.

H. A command shall return the link status of the engine control unit (ECU), reporting UP or DOWN depending on whether any ECUs are currently responding.

I. The command interface shall allow variable response-request time (e.g., in milliseconds) to support adjustable timeout for commands depending on complexity.

J. A command to retrieve an atomic data value from the specified bus.

K. A command to configure a continuous data monitoring process. In particular, the command may specify a list of vehicle data elements, which buses and which ECUs vehicle data elements should be obtained from, and the frequency at which values associated with the list of vehicle data elements are obtained. These values are queued up for access by the application processor 36. When requested, the values are reported or returned with timestamps. The monitor will enforce proper bus operation by, for example, not allowing query parameters that would exceed a query frequency beyond the capacity of the vehicle communications bus interface.

L. A command to obtain the voltage levels of the vehicle electrical system of vehicle 22.

M. A command to obtain VIP firmware version information.

N. A command to control what voltage levels should trigger a wake in activity detection and wake routine 164.

O. A command to enter sleep mode.

P. A command to retrieve freeze frames from a specified bus and ECU.

Q. A command to send a signed and encrypted list of vehicle communications bus codes that are safe to send on the vehicle communications bus. This list is per vehicle communications bus interface and per ECU. If the list is found invalid, it is rejected. Attempts to install such an invalid list repeatedly in a short time should disable this functionality until power loss. Once a proper list is installed, the vehicle interface processor 26 will not send any code out to any ECU on any vehicle communications bus that is not listed.

SafeDetect OBD Protocol Detection Algorithm:

A common problem encountered when designing OBD devices is interference with normal bus communication, which manifests itself in the form of warning lights on the dashboard, engine stalls, and other undesired effects. The majority of the time, the interference happens while the OBD device is attempting to discover the OBD protocol in use. The automatic OBD protocol discovery algorithm described below is designed to greatly minimize the chances of the OBD device interfering with vehicle operation.

Example Automatic OBD Protocol Discovery Algorithm:
1. Monitor the SAE J1850 VPW bus for any messages. If no messages were detected, send a service $01 PID $00 request message on the SAE J1850 PWM protocol; if a service $01 PID $00 response message(s) is received, then SAE J1850 PWM is the vehicle's OBD protocol.
2. Monitor the SAE J1850 PWM bus for any messages. If no messages were detected, send a service $01 PID $00 request message on the SAE J1850 VPW protocol; if a service $01 PID $00 response message(s) is received, then SAE J1850 VPW is the vehicle's OBD protocol.
3. Transmit the initialization sequence specified in ISO 9141-2; if the initialization sequence is completed successfully, send a service $01 PID $00 request message; if a service $01 PID $00 response message(s) is received, then ISO 9141-2 is the vehicle's OBD protocol.
4. Transmit the initialization sequence specified in ISO 14230-4; if the initialization sequence is completed successfully, send a service $01 PID $00 request message; if a service $01 PID $00 response message(s) is received, then ISO 14230-4 is the vehicle's OBD protocol.
5. Monitor the CAN bus for traffic; if traffic is present, automatically detect and record the baud rate. If traffic is detected at baud rate other than 500 kbps or 250 kbps, ISO 15765-4 is not the vehicle's OBD protocol. If traffic is detected at 500 kbps or 250 kbps is detected, count the number of 11-bit & 29-bit IDs transmitted by ECUs in a given unit of time. Send a service $01 PID $00 request message on the automatically detected baud rate, using CAN ID type with the highest detected count; if a service $01 PID $00 response message(s) is received, ISO 15765-4 at the automatically detected baud rate and CAN ID type is the vehicle's OBD protocol. If a service $01 PID $00 response message(s) is not received, send a service $01 PID $00 request message on the automatically detected baud rate, using the alternative CAN ID type; if a service $01 PID $00 response message(s) is received, ISO 15765-4 at the automatically detected baud rate and CAN ID type is the vehicle's OBD protocol.
6. If no traffic is detected on the CAN bus, send a service $01 PID $00 request message on each of the legislated CAN baud rates (500 & 250 kbps) and CAN ID types (11-bit & 29-bit), listening for a service $01 PID $00 response message(s) after each transmission. If a service $01 PID $00 response message(s) is received, ISO 15765-4 at the specified baud rate and CAN ID type is the vehicle's OBD protocol. If a service $01 PID $00 response message(s) is not received, but other valid CAN messages are detected, record the baud rate and use it during the subsequent connection attempts; do not attempt any further transmissions on any other CAN baud rates.
7. Once a protocol is successfully discovered, do not run this algorithm until the next power cycle.

Engine Crank and Start Detection and Counting Sequence (Example of Crank/Engine Start Detection Routine 172):
1. Vehicle interface processor (VIP) monitors vehicle battery voltage.
2. VIP continuously adjusts its trigger points based on the vehicle's average battery voltage to account for such things as electrical system noise (momentary spikes & dips) and voltage changes due to battery charge state.
3. Intermittent voltage dropouts are filtered out to prevent false crank detections due to vibration-induced contacts jitter.
4. VIP detects engine cranks by detecting dips in the vehicle battery voltage, which are consistent with an engine cranking event.
5. VIP detects engine start by tracking system voltage change to a higher (charging) voltage.

Safe DTC Retrieval:
On some vehicles, requesting data that results in multi-frame responses potentially causes undesired vehicle operation. In order to avoid that, the following safe DTC retrieval algorithm(s) are used:
Retrieval of Stored DTCs:
1. Request stored DTC count from the vehicle ECU.
2. Determine maximum number of responses from each ECU.
3. If the vehicle protocol is ISO 15765-4 or each ECUs DTC response fits within a single message, request stored DTCs.
4. If the vehicle protocol is ISO 9141-2 or ISO 14230-4 and at least one ECU is expected to respond with a multi-frame message, (a) poll vehicle speed and (b) as soon as vehicle is stationary, request stored DTCs.
5. If the vehicle protocol is SAE J1850 and at least one ECU is expected to respond with a multi-frame message, (a) poll vehicle speed and (b) as soon as vehicle is stationary, (i) poll engine RPM, and (ii) as soon as engine is off, request stored DTCs.
Retrieval of Pending DTCs:
1. If the vehicle protocol is ISO 15765-4, request pending DTCs.
2. If the vehicle protocol is ISO 9141-2 or ISO 14230-4, (a) poll vehicle speed, and (b) as soon as vehicle is stationary, request pending DTCs.
3. If the vehicle protocol is SAE J1850, (a) poll vehicle speed, and (b) as soon as vehicle is stationary, (i) poll engine RPM, and (ii) as soon as engine is off, request pending DTCs.
Safe VIN Retrieval
On some vehicles, requesting VIN causes undesired vehicle operation. In order to avoid that, the following safe VIN retrieval algorithm is used:
1 If the vehicle protocol is ISO 15765-4, request VIN.
2. If the vehicle protocol is ISO 9141-2 or ISO 14230-4, (a) poll vehicle speed in background, and (b) as soon as vehicle is stationary, request VIN.
3. If the vehicle protocol is SAE J1850, (a) poll vehicle speed in background, and (b) as soon as vehicle is stationary, (i) poll engine RPM, and (ii) as soon as engine is off, request VIN.

IX. Alternative Embodiments of Invention

Alternative embodiments include CPUs that have both an application processing core and a separate I/O (Input/Output) processing core. One such processor is the NXP LPC4300 which has an ARM Cortex M4 application processor 36 and an ARM Cortex M0 I/O processor.

On this processor, the vehicle interface processor 26 is a subsystem of the application processor 36. All the same functionality from the preferred embodiment is still present on the vehicle interface processor 26 but the processor data interconnect system 42 to the Application processor 36 will typically be a memory bus. Also, the processor power and control signal system 40 between the vehicle interface processor 26 and the Application processor 36 will have a different method defined by the vendor of the CPU.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

What is claimed is:

1. A vehicle interface system for accessing data in real time from an onboard diagnostics system through a vehicle interface and a vehicle communications bus and transmitting the data to an application processor running an application primary process, comprising:
   a vehicle interface processor;
   a processor data interconnect system capable of transferring data between the vehicle interface processor and the application processor;
   a vehicle communications bus electrical connection system operatively connected to the vehicle interface and capable of transferring diagnostic data between the vehicle interface processor and the onboard diagnostics system;
   vehicle interface software running on the vehicle interface processor; and
   an application data collection process running on the application processor using spare cycles not used by the application primary process, where the application data collection process communicates with the vehicle interface software using the processor data interconnect system.

2. The vehicle interface system as recited in claim 1, further comprising:
   a processor power and control system capable of transferring processor power and control signals between the vehicle interface processor and the application processor; wherein
   the vehicle interface processor further sends processor power and control signals to and receives processor power and control signals from the application processor using the processor power and control system.

3. The vehicle interface system as recited in claim 1, in which the vehicle interface processor comprises a vehicle communications bus data polling list identifying data to be collected from the onboard diagnostics system.

4. The vehicle interface system as recited in claim 1, in which the vehicle interface processor comprises a vehicle communications bus received data processor for processing the stored data collected from the onboard diagnostics system.

5. The vehicle interface system as recited in claim 1, in which the vehicle interface processor comprises a vehicle communications bus polling scheduler for determining when data is collected from the onboard diagnostics system.

6. The vehicle interface system as recited in claim 5, in which the vehicle communications bus polling scheduler limits collection of data from the onboard diagnostics system based on traffic on the vehicle communications bus.

7. The vehicle interface system as recited in claim 1, in which the vehicle interface processor comprises a security component for limiting access to the vehicle communications bus.

8. A vehicle interface system comprising
   a vehicle comprising:
      an onboard diagnostics system,
      a vehicle interface, and
      a vehicle communications bus;
   a vehicle interface processor;
   an application processor;
   a processor data interconnect system capable of transferring data between the vehicle interface processor and the application processor; and
   a vehicle communications bus electrical connection system operatively connected to the vehicle interface and capable of transferring diagnostic data between the vehicle interface processor and the onboard diagnostics system;
   vehicle interface software running on the vehicle interface processor; and
   an application data collection process running on the application processor using spare cycles not used by the application primary process, where the application data collection process communicates with the vehicle interface software using the processor data interconnect system.

9. The vehicle interface system as recited in claim 8, further comprising:
   a processor power and control system capable transferring processor power and control signals between the vehicle interface processor and the application processor; wherein
   the vehicle interface processor further sends processor power and control signals to and receives processor power and control signals from the application processor using the processor power and control system.

10. The vehicle interface system as recited in claim 8, in which the vehicle interface processor comprises a vehicle communications bus data polling list identifying data to be collected from the onboard diagnostics system.

11. The vehicle interface system as recited in claim 8, in which the vehicle interface processor comprises a vehicle communications bus received data processor for processing the stored data collected from the onboard diagnostics system.

12. The vehicle interface system as recited in claim 8, in which the vehicle interface processor comprises a vehicle communications bus polling scheduler for determining when data is collected from the onboard diagnostics system.

13. The vehicle interface system as recited in claim 12, in which the vehicle communications bus polling scheduler limits collection of data from the onboard diagnostics system based on traffic on the vehicle communications bus.

14. The vehicle interface system as recited in claim 8, in which the vehicle interface processor comprises a security component for limiting access to the vehicle communications bus.

15. The method of accessing data from an onboard diagnostics system through a vehicle interface and a vehicle communications bus and transmitting the data to an application processor, comprising the steps of:
   providing a vehicle interface processor;
   providing a processor data interconnect system capable of transferring data between the vehicle interface processor and the application processor; and
   providing a vehicle communications bus electrical connection system operatively connected to the vehicle interface and capable of transferring diagnostic data between the vehicle interface processor and the onboard diagnostics system;
   running vehicle interface software on the vehicle interface processor;
   running an application data collection process on the application processor using spare cycles not used by the application primary process; and
   causing the application data collection process to communicate with the vehicle interface software using the processor data interconnect system.

16. The method as recited in claim 15, further comprising the steps of:

providing a processor power and control system capable of transferring processor power and control signals between the vehicle interface processor and the application processor; and causing the vehicle interface processor to send processor power and control signals to and receives processor power and control signals from the application processor using the processor power and control system.

17. The method as recited in claim 15, in which the vehicle interface processor comprises a vehicle communications bus data polling list identifying data to be collected from the onboard diagnostics system.

18. The method as recited in claim 15, further comprising a vehicle communications bus received data processor for processing the stored data collected from the onboard diagnostics system.

19. The vehicle interface method as recited in claim 15, in which the vehicle interface processor comprises a vehicle communications bus polling scheduler for determining when data is collected from the onboard diagnostics system.

20. The method as recited in claim 19, in which the vehicle communications bus polling scheduler limits collection of data from the onboard diagnostics system based on traffic on the vehicle communications bus.

21. The method as recited in claim 15, in which the vehicle interface processor comprises a security component for limiting access to the vehicle communications bus.

* * * * *